April 26, 1966
E. F. GORMAN ETAL
3,248,515
WELDING WIRE FEEDING SYSTEMS
Filed April 1, 1965
3 Sheets-Sheet 1
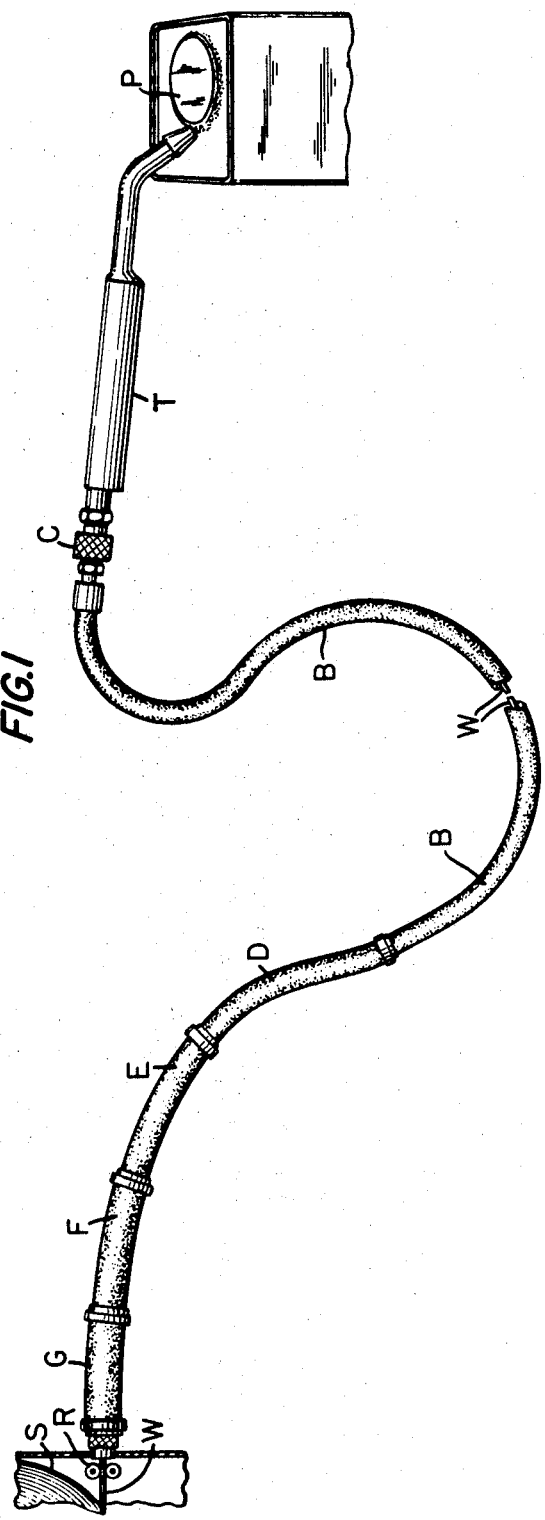
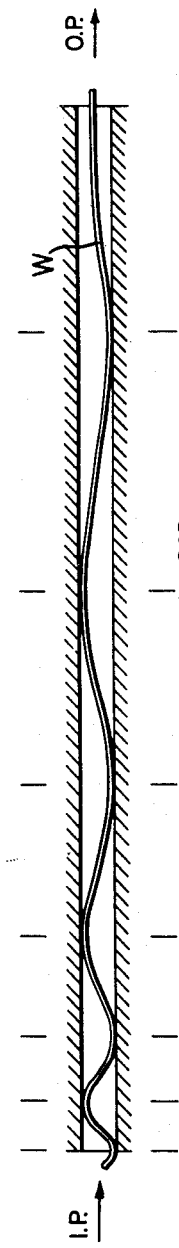
INVENTORS
EUGENE F. GORMAN
ARTHUR J. NEWMAN
BY
*Barnwell P. King*
ATTORNEY April 26, 1966 E. F. GORMAN ETAL 3,248,515
WELDING WIRE FEEDING SYSTEMS
Filed April 1, 1965 3 Sheets-Sheet 3

INVENTORS
EUGENE F. GORMAN
ARTHUR J. NEWMAN
BY
Barnwell Q. King
ATTORNEY

United States Patent Office

3,248,515
Patented Apr. 26, 1966

3,248,515
WELDING WIRE FEEDING SYSTEMS
Eugene F. Gorman, Morris Plains, and Arthur J. Newman, North Plainfield, N.J., assignors to Union Carbide Corporation, a corporation of New York
Filed Apr. 1, 1965, Ser. No. 444,762
16 Claims. (Cl. 219—130)

The present application is a continuation-in-part of application Serial No. 221,108, filed September 4, 1962, now abandoned.

This invention relates to welding wire feeding systems and more particularly to the push-type in which the welding wire is taken off from a reel and fed between motor driven gripping rollers through a flexible conduit to a welding zone.

Among the most important requirements for systems used to feed electrode or filler wire is that they must give reliable and consistent performance once they are in operation. Should an unintentional interruption of the feed occur, the result could be anything from a loss of welding time up to spoilage of a costly weldment. Also, there must be a uniform correspondence between the wire feed at the welding torch and that at the remotely located wire drive unit. Should differences occur, even though of momentary duration, there is then a loss of control over arc characteristics, weld metal deposition rates, and therefore of the entire welding operation.

The flexible conduit assembly is a basic link in a wire feed system. It permits the mounting of the relatively heavy bulky wire drive head at some distance from the welding torch (or cold rod attachment). Preferably the conduit should be highly flexible and of substantial length, especially for manual welding for which maneuverability is highly prized. In practice, however, conduits as used in push-type wire feeding systems are quite flexible but are limited to maximum lengths of about 10 to 17 feet. These relatively short distance limits apply to such widely different welding wires as 0.030 inch diameter soft aluminum, and ⅛ inch diameter high-strength steel. Attempts to push wires through longer distances have generally failed. After a relatively short time in operation, the wire motion either stopped entirely or become very erratic at the torch or output end. Even when operating within 10 to 17 foot length limits, present wire feeding systems are frequently on the verge of failure. Relatively small increases in friction due to arcing in torch contact tips or from chip and dirt accumulation are often enough to precipitate irregular wire feed at the output end or even catastrophic failure of the entire feed system.

Complaints about poor performance with push-type wire feeding systems have been a common occurrence ever since flexible conduits were first employed. Throughout the ensuing years repeated attempts were made to overcome the problems through the use of stronger drive systems, special drive roll designs, low friction conduit liners, increased clearance between the wire O.D. and the liner I.D., etc. Useful improvements in wire feeding performance were gradually obtained, at least within narrow ranges of operation, but no major breakthrough was developed.

It is therefore the main object of the present invention to obtain substantially greater reliability in welding wire feeding systems. Other objects are to increase the distance through which the wire may be reliably fed through a flexible conduit, to assure maximum control of wire feed speed at the weld zone, to reduce the friction developed in the flexible conduit, to increase the thrust force which a welding wire can continuously transmit through a flexible conduit to a torch, and to eliminate for practical purposes the dirt plugging problem. It is a further object to maintain a high degree of torch maneuverability without imparing any of the above-mentioned objectives.

With this as a background, and realizing that an effective push-type system is generally preferred over pull-gun operation, a basic investigation of wire feed systems was undertaken. It was determined than even with wire feed heads which delivered adequate drive force and uniform feed rates to wires as they entered the conduits, the desired reliability and consistency at the conduit output was still not obtained. The real problem was that the friction developed in standard flexible conduit assemblies can quickly build up to excessively high levels, even for relatively light loads at the conduit output.

Flexible wire feeding conduits were then analyzed and tested under idealized as well as practical conditions. It was found that significant reduction in friction could be obtained and preserved only by certain basic changes of conduit design, the four most important being: reduction of wire-to-liner clearance, increased liner support within the flexible casing, intermittent bearing support of the welding wire within the liner or conduit, and stiffening of the casing itself. Retention of adequate torch maneuverability can be obtained by gradually increasing the conduit flexibility along its length up to a design maximum at the torch end. Additional torch maneuverability can be obtained by means of an axially rotating coupling at the junction between the torch and the conduit.

The sum total of these improvements produced significantly better wire feeding through normal distances as well as through greatly increased distances. Output forces transmitted through the conduits were increased 300 percent, wire feed motion through and out of the conduit was made smoother and at a close relationship with its speed at the wire drive head, and the conduits were remarkably trouble-free compared to present assemblies. Preliminary trials have demonstrated that reliably good performance can definitely be obtained with conduit lengths of up to 40 feet and strong possibilities exist for further gains. Also, depite the overall stiffening of the conduit, actual torch maneuverability is increased by virtue of the rotary couplings.

According to the present invention, the flexible conduit comprises a longitudinally flexible radially relatively rigid tube having an internal tubular surface of antifriction material supported thereby having a low coefficient of friction with respect to the wire passing therethrough and of sufficient hardness to resist indentation due to radial loads imposed by bending of the wire and softening due to friction heat and of a diameter exceeding the wire diameter by a small clearance less than 20 percent of the wire diameter, preferably of the order of 10 percent of the wire diameter.

Preferably, the flexible conduit comprises an outer casing and a plastic liner secured therein with the outer surface of said plastic liner in contact with the inner surface of said casing preferably permanently secured together over a substantial part of their common area.

Preferably, the internal surface of said liner in contact with the welding wire should consist of a series of intermittent bearing supports with the support surfaces spaced apart such as to provide substantial dirt storage capacity between them.

Preferably, the common length of said casing and liner is greater than 17 foot, also preferably, the stiffness of said casing is increased toward the driving end thereof and a rotary coupling is interposed between the welding gun and the outlet end of said casing.

In the drawings:

FIGURE 1 is an assembly view of welding apparatus employing the welding wire feeding conduit which is the subject of the present invention;

FIGURE 2 is a diagram of the wire buckling under high column load;

As shown in FIGURE 1, the welding wire W is fed from a spool S between drive rollers R on through a flexible tube B which extends to a remote welding torch T. It is this flexible tube B which presents difficulties and problems solved by the present invention.

The new design concepts of the invention are for the most part diametrically opposed to conventional approaches. A better understanding of them can be obtained from the following discussion. The mechanical behavior of wire under load was studied as it was being fed through transparent plastic tubing. It was found that the wire acts as an excessively long column which buckles under negligible loads into a series of shorter column segments. The shortest segments occur at the conduit input end where column loads are highest, as shown in FIGURE 2. Each column segment presses against the conduit wall for support, giving rise to a local contact force and, hence, friction. As output loads are increased, the column segments become shorter and increase in number. Friction, however, grows at a rate much faster than the increase in friction points because of the wedging action produced by the buckled segments. Actually, friction increases exponentially with wire loading until a maximum load is reached above which no additional thrust force can be transmitted through the system, regardless of any increase in input force. This maximum load can be called the runaway friction limit.

Figure 3:
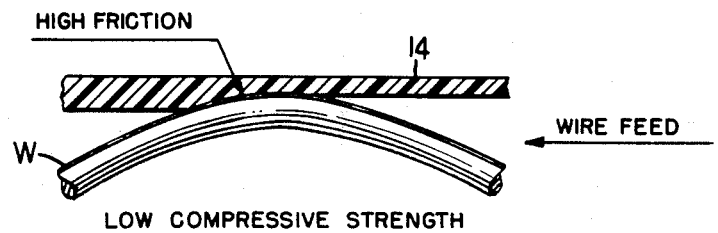
FIGURE 3 is a diagram of a liner with low compressive strength.

Contact pressures between wire and conduit surfaces were estimated to be as high as 10,000 p.s.i. Such compressive stresses exceed the limits of many plastics with the result that liner walls are deformed excessively and friction losses are increased. Also, the heat produced by friction acts to soften the plastic thereby leading to a further increase in friction, as shown in FIGURE 3.

Figure 4:
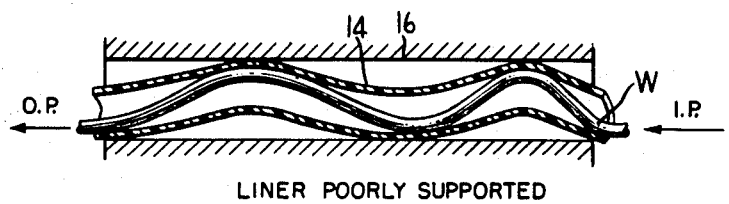
FIGURE 4 is a diagram of a poorly supported liner.

Despite the fact that the liner is placed under tension by the friction loads, there are also strong bending forces acting on the liner which are produced by the contact forces. Since plastic liners fit very loosely in the flexible casing, this added clearance allows the liner to buckle inside the casing. FIGURE 4 shows how an improperly supported liner is forced into buckled configuration which further increases friction losses in the conduit.

Figure 5:
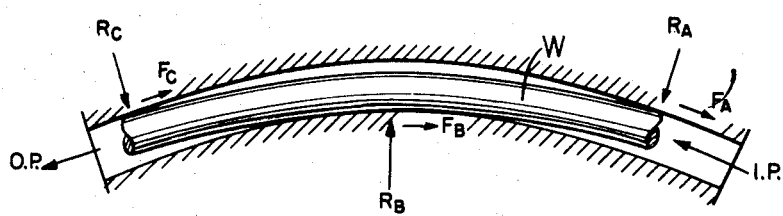
FIGURE 5 is a diagram of friction due to bending forces.
Figure 6:
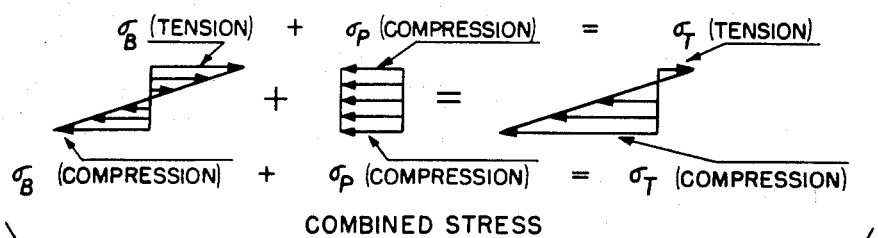
FIGURE 6 is a diagram of combined bending and axial stresses.

The high friction losses which occur when feeding wires through curved paths were related to the bending forces which the conduit must exert to bend the wire, as shown in FIGURE 5. The bending forces and, hence, friction go up as the fourth power of the wire diameter. This increase is much more rapid than the increase in wire column strength which goes up only as the second power of the wire diameter. Curved path friction is most rapidly increased to runaway proportions when the curvature is excessive for the particular wire. Under such conditions, a series of permanent sets or kinks are produced in the wire which oppose further motion through the conduit. Permanent set is most likely to occur at the conduit input end where the wire column loads are highest. FIGURE 6 shows how the stresses due to column load and bending combine to produce a total stress which can quickly exceed the elastic stress limits of the given wire.

In summary, small diameter wires develop high friction primarily because of their tendency to buckling collapse inside the conduit. Large diameter wires develop high friction primarily from bending forces exerted in curved paths. Intermediate size wires of about $3/64$ to $1/16$ inch diameter develop friction by a combination of the two friction mechanisms.

These friction generating mechanisms were overcome in the following successive steps. The use of closely-supported, minimum-clearance liners acted to minimize both the buckling and the wedging action of the column loaded wire. The result was a substantial increase in the runaway friction limit and the transmittable thrust force. Even though starting friction was somewhat higher, total friction under load was much less than normal. Ordinarily, reduction of wire-to-liner clearance would greatly increase the chances of jam-ups and wire seizure due to chip and dirt accumulations. This problem was eliminated by the use of conduits with spiral fluted internal surfaces.

For limiting wire path curvature to values which would avoid permanent set in the wire, conduit flexibility was proportioned from zero flexibility at the input end, with a gradual or stepwise increase up to a calculated maximum value at the output or welding torch end. A further increase in operator flexibility was obtained by installing an axially rotating coupling at the junction between the conduit and welding torch.

Output force delivered through flexible conduits can be increased 300 percent by designing conduits with extremely small wire clearance, by rigidly supporting the liner within its casing, and by restricting conduit flexibility to values which avoid permanent set in the wire. On the same basis, increases can be made in useful conduit length to three or more times present standard lengths.

Tests with conduits of up to 23 feet in length and extrapolation of data have indicated that optimum performance can be obtained with properly designed conduits of lengths up to about 25 feet with aluminum wire and about 40 feet for steel wires of 0.030 inch diameter. These distances probably can be greatly increased with larger diameter wires.

Figure 7:
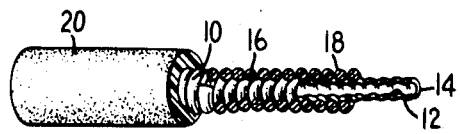
FIGURE 7 is a perspective view partly in section of a flexible conduit according to the preferred embodiment of the present invention.

The preferred embodiment of the flexible conduit, shown in FIGURE 7, comprises a longitudinally flexible radially rigid tube 10 having an internal tubular surface 12 of antifriction material supplied thereby. This surface is the interior of a liner 14 formed by a tube of nylon, Teflon, or other antifriction plastic or resin having a low coefficient of friction with respect to the wire W passing therethrough and of sufficient hardness to resist indentation due to bending of the wire and softening due to friction heat. Preferably, these materials should have a Rockwell hardness value (ASTM test method D-785) exceeding R-100 or a durometer hardness (ASTM test method D-1706) exceeding D-75.

The surface is of a diameter exceeding the diameter of the wire W by a small wire-to-liner clearance to allow passage of the wire therethrough. However, this clearance is less than 20 percent of the wire diameter and preferably of the order of 10 percent of the wire diameter.

The conduit 10 also comprises an outer casing 16 having the liner 14 secured therein, with the outer surface of the liner 14 in contact with the inner surface of the casing 16 for increased liner support, and preferably secured together over a substantial part of their common area by a suitable adhesive such as glue.

The outer casing 16 is preferably a coil of corrugated metal strip 18 but may be a braid of mesh or strands of metal or other stiffening material of sufficient (but controlled) flexibility. The casing 16 is preferably enclosed in a cover sheath 20 of rubber or other flexible plastic insulating material to protect the metal of the casing from electrical contact.

Preferably, the maximum flexibility of the conduit is provided in the output or torch end portion B as shown in FIG. 1, and gradually or in stepwise portions D, E and F is reduced to zero at the input or drivehead end portion G. A rotary coupling C is interposed between the welding gun T and the outlet end of the portion B. Preferably, the maximum flexibility of the conduit is restricted to values as shown in the following table:

*Minimum allowable bend radii for flexible conduits (based on bending stress limits)*

| Welding wire | | Minimum bend radii in inches | | | | |
| | | Allowable conduit bend radius, in inches, given wire diameter, inches | | | | |
| Type | Tensile strength p.s.i. | Group I[1] | | Group II[1] | | Group III[1] | |
| | | 0.020 | 0.030 | 0.045 | 0.062 | 0.093 | 0.125 |
| Aluminum | 25,000 | 4 | 6 | 9 | 12 | 18 | 25 |
| Aluminum alloy | 50,000 | 2 | 3 | 4½ | 6 | 9 | 12½ |
| Steel | 100,000 | 3 | 4½ | 6¾ | 9 | 14⅜ | 19 |
| Stainless | 150,000 | 2 | 3 | 4½ | 6 | 9⅝ | 12⅝ |

[1] For Group I wires (0.020 inch and 0.030 inch diameters), a minimum bend radius of 6 inches would be satisfactory for most commercial wire materials; for Group II wires, use minimum of 12 inches; and for Group III wires, use minimum of 25 inches.

Figure 8:
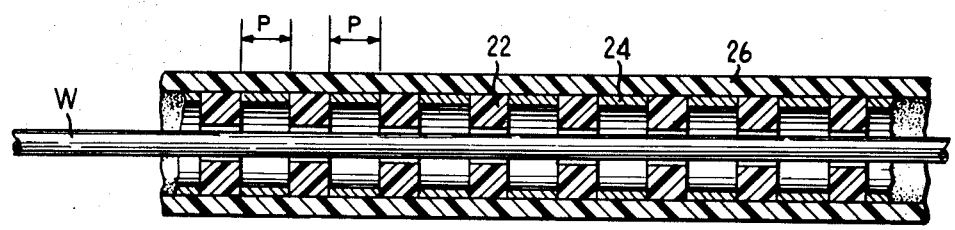
FIGURE 8 is a section of a conduit with intermittent wire support.

In the form shown in FIGURE 8, the liner is formed by circular discs 22 of plastic material having central bores with the aforesaid preferred wire-to-liner clearance. Alternating with the discs 22 are spacer rings 24 of a diameter much greater than that of the wire, preferably contacting the inner surface of the casing 26, and preferably of axial dimension greater than that of the discs 22. The spaces between the discs allow room for dirt and chips to fall clear of the wire rather than become wedged inside and cause jamming in the liner. Preferably, the axial distance between the discs should be between 2 and 16 times the diameter of the wire being fed through the conduit.

Figure 9:
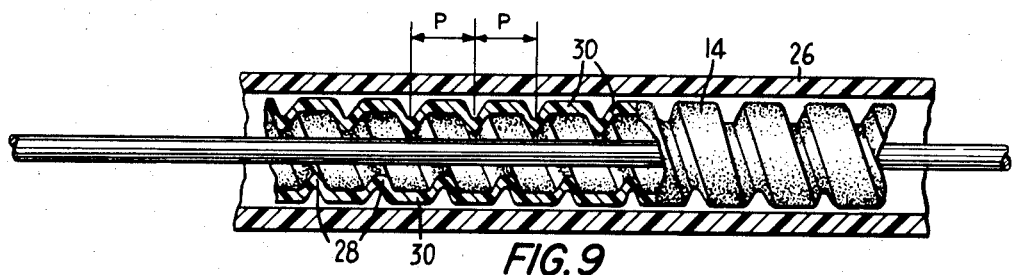
FIGURE 9 is a section of a conduit with spiral support and flute.

In the form shown in FIGURE 9, the preferred wire-to-liner clearance is provided by helical internal ridges 28 which form bearing guides spaced apart by flutes 30 which form a channel to receive and dispose of dirt and chips. Again, the spacing between the spiral ridges should be no more than 2 to 16 times the welding wire diameter. Comparison tests were made between the spiral liner shown in FIGURE 9 and standard liners of constant I.D. by feeding wires having dirty surfaces. Some ancient spools of 0.030 in. diameter copper coated Linde Oxweld 65 steel wire with heavy accumulations of rust and dirt were collected for the tests. The following table shows the amount of wire fed through the various liners of 10 foot lengths until failure occurred or the test was stopped:

| Type liner | I.D., inch | Pound of wire fed | Results |
|---|---|---|---|
| Spiral | 0.038 | 50 | No change in friction. |
| Smooth bore | 0.042 | 10 | Jam-up failure. |
| Spiral | 0.038 | 175 | No change in friction. |
| Smooth bore | 0.052 | 50 | Jam-up failure. |

These tests indicated that in the case of standard liners, those with small I.D.'s would quickly fail due to jam-up. Radiographic and visual examinations of the 0.042 inch I.D. standard liner showed that all of the dirt accumulated in a section of 1 inch length near the input end of the liner. Since there was very little clearance between the wire and the liner walls, the dirt tended to pack tightly until seizure occurred. In the case of the 0.052 in. standard liner, the deposits occurred at several sections of 3 inch to 5 inch length and near the output end. Here again, tight packing occurred followed by seizure of the wire. With the spiral liner, however, no jam-ups ever occurred, even though very large quantities of powdery grit were deposited in the spiral flute. No packing of the grit occurred as evidenced by the fact that the dirt could easily be shaken from the liner after the tests. The reason for this is that the wire was supported away from the dirt and, therefore, did not compress this into a hard mass. Also, when the spiral channel was filled at one point, the excess was easily moved further downstream to a unfilled portion of the channel. The 175 pound quantity of wire fed through the spiral liner was approximately equal to about four days of normal welding.

Figure 10:
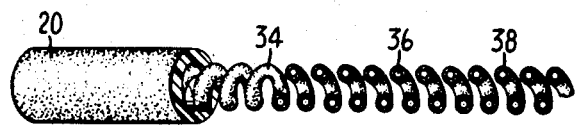
FIGURE 10 is a perspective view partly in section of a modified construction employing a coil liner.

In the form shown in FIGURE 10, the conduit 34 comprises a coil 36 of metal wire coated with plastic or enamel 38 so that the inner surface of the coating 38 forms the liner and sheath 20 forms the outer casing. The coil 36 may be expanded to increase the spacing between bearing supports to receive dust and chips.

Figure 11:
FIGURE 11 is a similar view of a further modification employing a thick-walled liner.

In the form shown in FIGURE 11, the liner is formed by a thick walled plastic tube 40 in which the wall thickness is about the same or greater than the wire diameter.

Figure 12:
FIGURE 12 is a similar view of a modification employing a thin-walled stiffener.

In the form shown in FIGURE 12, the liner has an outer casing 42 of thin wall stiffener metal or laminated plastics.

Figure 13:
FIGURE 13 is modified construction employing a unitary or integral plastic tube.

In the form shown in FIGURE 13, the casing liner and cover may be formed by a single length of thick-walled plastic tube 44.

As used herein the term "elongated" as applied to the conduit means several feet in length, 10 to 17 feet, for example, and even longer.

What is claimed is:

1. Welding apparatus comprising a welding gun, welding wire, an elongated flexible conduit for guiding said wire to said gun, and means for driving said wire through said conduit, said conduit comprising a plurality of tubular portions connected together in end-to-end relationship to provide a longitudinally flexible radially relatively rigid tube, said tube having uniformly spaced internal tubular slide bearing surfaces supported thereby for guiding said wire through the conduit, said surfaces having a hardness exceeding R-100 to resist compression due to bending of the wire and softening due to friction heat, and said internal tubular slide bearing surface being of a diameter exceeding the wire diameter by a small clearance less than 20 percent of the wire diameter, and means rotatably coupling said gun to the wire exit end of the wire output portion of the tube, the relative flexibility of said portions increasing stepwise from the input portion to the output portion of the tube to increase the relative stiffness of the tube from the wire output to the input end thereof whereby longitudinal movement of the wire through the conduit by said driving means is facilitated.

2. Welding apparatus as claimed in claim 1, in which said clearance is of the order of 10 percent of the wire diameter.

3. Welding apparatus as claimed in claim 1, in which said tube comprises an outer casing and a plastic liner secured therein with the inner surface of said outer casing in supporting contact with the outer surface of said plastic liner at regularly spaced intervals therealong.

4. Welding apparatus as claimed in claim 3, in which said wire contacting surfaces are permanently secured together over a substantial part of their common area.

5. Welding apparatus as claimed in claim 1, in which said internal tubular slide bearing surfaces are interrupted by annular recesses between the spaced wire bearing areas thereof to form receptacles for chips and dirt to fall clear of the wire.

6. Welding apparatus as claimed in claim 4, in which the common length of said conduit is greater than 17 feet.

7. Welding apparatus as called for by claim 1, in which the flexible conduit comprises bearing guides of low friction material having arcuate inner surfaces of a radius slightly larger than the wire and spaced along the path of the wire leaving chambers between said bearing guides of much greater diameter than the wire.

8. Welding apparatus as called for by claim 1, in which the flexible conduit comprises bearing guides of low friction material having arcuate inner surfaces of a radius slightly larger than the wire and spacers alternating with said bearing guides of a radius much greater than the wire.

9. Welding apparatus as claimed in claim 8, in which the axial dimension of said spacers is greater than the axial dimension of said bearing guides.

10. Welding apparatus as claimed in claim 8, in which in axial section said bearing guides are internal ridges and said spacers are bowed outwardly.

11. Welding apparatus as claimed in claim 8, in which said bearing guides are formed by wire springs having their turns spread apart to allow for chip and dirt clearance.

12. Welding apparatus as called for by claim 1, in which the flexible conduit comprises a helically corrugated guide tube of flexible non-metallic organic plastic material having a narrow continuous internal helical ridge the convolutions of which form bearing guides for the wire, and a wide continuous internal flute the convolutions of which form receptacles for chips and dirt to fall clear of the wire.

13. Welding apparatus comprising a welding torch, an elongated flexible conduit connected at one end to said torch, and means connected to the other end of said torch for driving a bare metal welding wire longitudinally through said flexible conduit and torch, said flexible conduit being provided with an inner relatively hard plastic liner in uniformly spaced spiral contact with such wire as the latter is driven longitudinally therethrough by said wire driving means, characterized in that the relative stiffness of the conduit is increased stepwise from the wire output end toward the wire input end thereof, whereby the conduit flexibility increases stepwise from a minimum value at the wire input end to a maximum value at the wire end of the conduit while the so-driven wire is substantially supported radially throughout the length of the conduit by the inner surface of the liner, to minimize undesirable buckling collapse and stoppage of the so-fed wire within the liner.

14. Welding apparatus comprising a wire driving mechanism, a gun, and an elongated flexible electrode wire guiding conduit for conducting the wire from said wire driving mechanism to said gun, comprising a plurality of elongated tubular portions connected in series end-to-end with one another, the wire input portion thereof adjacent such wire driving mechanism being substantially stiffer than that of the wire output portion adjacent such gun, the wire output portion being thereby substantially more flexible than the wire input portion, whereby stoppage of the longitudinal movement of the wire through the conduit by such driving mechanism is minimized when the gun is in use.

15. A conduit as called for by claim 14, in which said elongated portions comprise plastic lined helical tubes the relative conduit flexibility of which increases stepwise from tube to tube from a minimum value in the elongated input tube portion to a maximum value in the output tube.

16. A conduit as called for by claim 14, comprising a rotary coupling connecting the output portion to the gun.

References Cited by the Examiner

UNITED STATES PATENTS

| | | | |
|---|---|---|---|
| 243,209 | 6/1881 | Chadwick | 15—162 |
| 1,508,711 | 9/1924 | Nobel | 219—124 |
| 1,742,353 | 1/1930 | Hunter | 138—108 X |
| 1,935,999 | 11/1933 | Tessky | 130—108 X |
| 2,146,412 | 2/1939 | Arens. | |
| 2,539,329 | 1/1951 | Sanders. | |
| 2,666,832 | 1/1954 | Landis et al. | 219—130 |
| 2,817,749 | 12/1957 | Flood et al. | 219—130 |
| 2,821,092 | 1/1958 | Cordora et al. | |
| 2,830,622 | 4/1958 | Roberts et al. | 138—121 |
| 2,833,567 | 5/1958 | Bacher et al. | 285—95 |
| 2,986,169 | 5/1961 | McCormick | 138—109 |
| 3,046,589 | 7/1962 | Bonnevie-Svendsen | 15—162 |

RICHARD M. WOOD, *Primary Examiner.*

JOSEPH V. TRUHE, *Examiner.*